(12) United States Patent
Goldsmith

(10) Patent No.: US 6,754,643 B1
(45) Date of Patent: Jun. 22, 2004

(54) ADAPTIVE METHOD WITH INTERCESSORY FEEDBACK CONTROL FOR AN INTELLIGENT AGENT

(75) Inventor: Steven Y. Goldsmith, Rochester, MN (US)

(73) Assignee: Sandia Corporation, Albuquerque, NM (US)

(*) Notice: Subject to any disclaimer, the term of this patent is extended or adjusted under 35 U.S.C. 154(b) by 576 days.

(21) Appl. No.: 09/882,397

(22) Filed: Jun. 14, 2001

Related U.S. Application Data

(60) Provisional application No. 60/237,934, filed on Oct. 3, 2000.

(51) Int. Cl.[7] .............................................. G06F 15/18
(52) U.S. Cl. ....................................................... 706/14
(58) Field of Search ........................................... 706/14

(56) References Cited

U.S. PATENT DOCUMENTS 6,192,354 B1   2/2001   Bigus et al. .................. 706/46
6,199,099 B1   3/2001   Gershman et al. ........... 709/203

OTHER PUBLICATIONS

Morsy M. Cheikhrouhou, "BDI–Oriented Agents for Network Management", Global Telecommunication Conference, IEEE, Dec. 1999.*

* cited by examiner

Primary Examiner—George B. Davis
(74) Attorney, Agent, or Firm—Carol I. Ashby

(57) ABSTRACT

An adaptive architecture method with feedback control for an intelligent agent provides for adaptively integrating reflexive and deliberative responses to a stimulus according to a goal. An adaptive architecture method with feedback control for multiple intelligent agents provides for coordinating and adaptively integrating reflexive and deliberative responses to a stimulus according to a goal. Re-programming of the adaptive architecture is through a nexus which coordinates reflexive and deliberator components.

47 Claims, 9 Drawing Sheets

US 6,754,643 B1

ADAPTIVE METHOD WITH INTERCESSORY FEEDBACK CONTROL FOR AN INTELLIGENT AGENT

This application claims the benefit of U.S. Provisional Application No. 60/237,934, filed on Oct. 3, 2000, and is incorporated herein by reference.

This invention was made with Government support under Contract DE-AC04-94AL85000 awarded by the U.S. Department of Energy. The Government has certain rights in the invention.

RELATED PATENT APPLICATIONS

Co-pending, related applications entitled "Adaptive Architecture for an Intelligent Agent," "Adaptive Method for an Intelligent Agent," and "Adaptive Architecture with Intercessory Feedback Control for an Intelligent Agent," all with the same inventor and all assigned to Sandia National Laboratories, have been filed on the same date as this application.

BACKGROUND OF THE INVENTION

This invention relates to the field of agent architectures and more particularly to methods for adaptive architectures with feedback control for controlling responses of intelligent agents to stimuli.

Agent architectures are information and transaction processing architectures especially for use with intelligent agents. Agent architectures that request, process, and present information can be used to facilitate electronic commerce and electronic information transactions including tele-education, telecommunication within the business environment (for example, secure information sharing among users that can be on different networked computers and transaction information sharing among partners as in banking or commerce), and tele-medicine.

Agent architectures that incorporate various levels of agent learning have the capability to adapt and improve decision-making with the addition of agent rules and application area requirements.

Agent architectures are not limited to implementation on fixed computing platforms but can be distributed and used on mobile platforms having compute capabilities (for example, mobile robots in applications such as searching and physical security).

Gershman et al., U.S. Pat. No. 6,199,099, issued Mar. 6, 2001, discloses a system for information retrieval and display on a mobile computing environment utilizing a distributed communication network. Gershman et al. uses object-oriented programming in one embodiment to obtain product information with a portable portal into a computer network.

Bigus et al., U.S. Pat. No. 6,192,354, issued Feb. 20, 2001, discloses a system for optimizing performance of a computer task through the use of multiple intelligent agents suited to perform the computer task but possessing varied degrees of domain knowledge.

There is a need for an architecture with feedback control for one or more intelligent agents adaptively integrating reflexive and deliberative responses to stimuli.

SUMMARY OF THE INVENTION

The present invention provides an adaptive method for controlling an intelligent agent to respond to a stimulus according to a goal, the method implemented as an adaptive architecture running on at least one processor, comprising: generating a reflex action to the stimulus by the intelligent agent; generating a planned action to the stimulus by the intelligent agent, according to the goal; and coordinating the reflex action generation and the planned action generation by a nexus to re-program the adaptive architecture; wherein the nexus comprises an intercessory feedback control.

BRIEF DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

Figure 1:
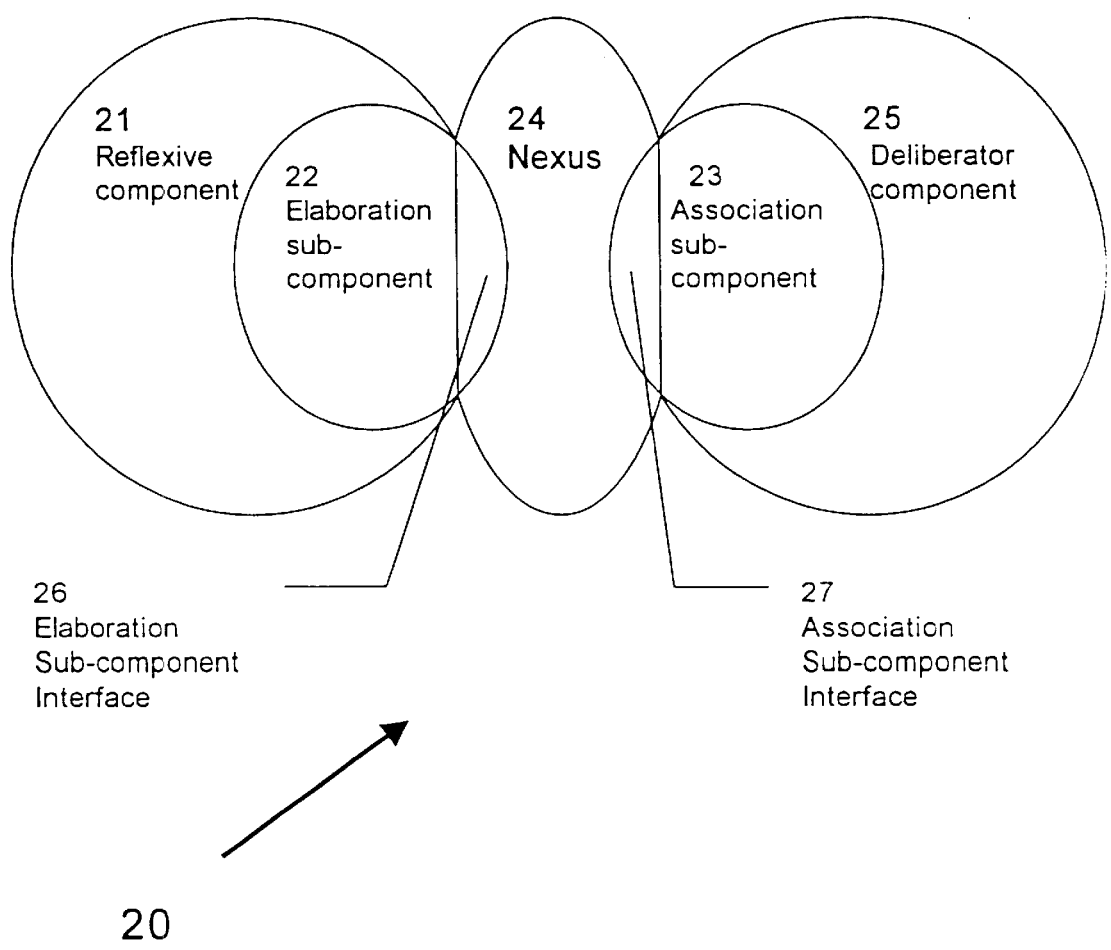
FIG. 1 is a diagram depicting an adaptive architecture for an intelligent agent with an interfacing nexus according to the present invention.

Agent architectures are information and transaction processing architectures especially for use with intelligent agents. Agent architectures can be used to facilitate electronic commerce and electronic information transactions including tele-education, telecommunication within the business environment (for example, secure information sharing among users that can be on different networked computers and transaction information sharing among partners as in banking or commerce), and tele-medicine. Agent architectures that incorporate agent learning have the capability to adapt and improve decision-making with the addition of agent rules and application area requirements. Agent architectures are not limited to implementation on fixed computing platforms but can be distributed and used on mobile platforms (for example, mobile robots in applications such as searching and physical security).

The present invention provides an adaptive architecture with feedback control for one or more intelligent agents adaptively integrating reflexive and deliberative responses to stimuli. Re-programming of the adaptive architecture is through a nexus which coordinates reflexive and deliberator components.

An adaptive architecture can be used with one intelligent agent or with multiple intelligent agents. The ability to adapt an architecture to stimuli in an environment external to the architecture and to internal feedback controls allows the adaptive architecture to be applicable to more complex agent transactions requiring coordination and reasoning in the response rather than being limited to a purely predetermined or reflexive response. Association of perceptions of the environment with expectations (and updating expectations according to planned actions to meet a defined goal) adds response discrimination to a purely reflexive response. A high-level architecture that also adapts the reflexive response according to feedback from a more deliberative and discriminating planned response as in the present invention can continuously upgrade the reflexive action response. The present invention integrates reflex responses with planned responses while improving both types of responses during the course of execution.

The method and architecture can include the following: contingency plans to respond to adverse stimuli or stimuli out of a normal range, knowledge of what already has been done, communication (for example, over a network), and intelligent decision making. It is understood by those skilled in the art that intelligent agent architectures also are referred to as cognitive architectures. An intelligent agent can securely collaborate according to a goal with other intelligent agents in a plurality of agents and can share an agent state and an agent plan through various communication means—for example, computer network communications, information packets, TCP/IP, communication protocols, data streams, and other ways of communicating known to those skilled in the art.

Stimuli to which the intelligent agent responds include: out-of-normal transactions (for example, in electronic transactions in commerce, business, tele-medicine, and similar transactions), computer and computer network intrusions (for example, in computer and security applications), communications and sensor readings (for example, on a robot intelligent agent), and any other stimuli that can be communicated to the intelligent agent. An agent response to meet a goal include, for example: transaction denial to protect information in electronic transactions, computer access denial to protect a computer or network, a coordinated search for a target objective by one or more robot agents, patrolling or security response for physical protection by robot air agent(s), and any other response by an intelligent agent to meet a goal.

In one adaptive architecture application, the adaptive architecture can be integrated with network and computer security to address a malicious insider threat or a computer network intrusion. In a multi-agent architecture with security among one or more computers in a network, multiple agents can have secure transactions through a secure distributed collection of agents with decentralized domain authority (for example, in an intra-company-network providing an autonomous high-integrity environment).

The application of adaptive architectures to intra-networks can be extended to external networks of computers and to networks-of-networks of computers (for example, a web of computers such as the internet). As the application network becomes more extensive, issues surrounding transactions among agents, in an architecture conducive to adaptive learning, and the need for security in transactions become increasingly important and increasingly difficult to address.

Other applications of an adaptive architecture are in the control of physically mobile agents (for example, a group of robots in a collective responding to stimuli or cooperating to meet a goal), as well as the control of software agents (for example, nodes in a computer network or one node of a network).

Implemented instances of intelligent agents include processes (for example, computational programs) that execute under an operating system (for example, Linux, MacOS, UNIX, Windows NT) on conventional computing hardware platforms (for example, Intel and PowerPC). Intelligent agents also can be implemented on specialized hardware-based platforms. Object-oriented programming languages are suitable for developing long-lived distributed dynamic objects functioning as intelligent agents.

The adaptive architecture can be implemented utilizing one or more computing devices: on general-purpose computers using random access memory (RAM), read-only memory (ROM), computer disk; on one or more networked computers perhaps in different geographic locations, and on special-purpose computers (for example, a Lisp processing computer or a parallel-processing computer); and can be implemented as specialized hardware devices: application specific integrated circuit (ASIC), programmable read-only memory (PROM), re-programmable memory, or other devices that implement program-type instructions in hardware or firmware.

Adaptive Architecture and Intelligent Agent Terminology

The term intelligent agent within the context of the adaptive architecture of the present invention describes a concentration of computation that is autonomous, introspective, long-lived, cooperative, secure, and robust. These characteristics distinguish intelligent agents from more conventional computational structures such as processes and subroutines.

The implemented intelligent agents are built on a substrate of distributed dynamic objects, which provide a computing location-independent, object-oriented programming metaphor, with long-lived objects. That the objects are "distributed" means the services of the objects can migrate among nodes on a network and execute on different nodes at different times. That the objects are "dynamic" means the structure and class membership of the objects can be changed at run time without stopping and restarting the system. Object classes are themselves objects that can be distributed as meta-data (for example, higher-level organized forms of data). The object-oriented flexibility just described is valuable in computing environments where software must adapt continuously over its lifetime without requiring that it be stopped, recompiled, and restarted. Intelligent agents within the context of the present invention are collections of distributed dynamic objects and metaobjects with the additional capabilities of reaction, deliberation, secure collaboration, and goal satisfaction.

The general-purpose adaptive agent architecture of the present invention has been implemented in an agent programming framework that is CLOS-based and supports object-oriented development of agent applications. CLOS is Common Lisp Object System. The architecture classes and methods have been specialized to create sensory, perceptual, action, and deliberative components.

Adaptive Architecture Sites

The intelligent agent in the adaptive architecture of the present invention comprises multiple instances of a primary abstraction called "site." Note that "site" is a software structure that implements the adaptive architecture with one or more intelligent agents. Each site performs a specific function (for example, sensation, perception, actuation, and deliberation) and can be redundant, overlapping in functionality with other sites, to enhance fault tolerance and load leveling. New types of sites can be designed and added to an agent species. Every site obtains basic common elements obtained from a single software library called a basic-site. The common abstract superclass basic-site provides generic site functions, classes, and interfaces.

Site instances are active composite objects constructed from several component classes. Each site instance is represented as a tuple of objects, having the following representative form:

{namespace, nucleus, process, housekeeping functions, function-specific objects}. (1)

In an implementation of the present invention, each site has a distinct and private namespace object that controls external access to the site's symbols and enables the creation of symbols and symbol names without affecting other sites. The namespace is an object identifier that serves as the unique identifier for the site. A special class metaobject containing a singleton instance, called the nucleus in the representative tuple above, determines the functions and structure of the site. Each site is associated with a private process (for example, a lightweight thread in a single process implementation) in which all housekeeping functions execute. In general, housekeeping functions perform general operations common to all sites to maintain proper operation of the site, also called homeostasis. Housekeeping functions can include, but are not limited to: intra-site communications, fault tolerance, agent initialization, fault monitoring, state-of-health handshake (for example, watchdog monitor), performance monitoring, and site re-programming.

Sites are constructed and interconnected during agent creation. An intelligent agent's capabilities and behavior are determined by the number and type of sites, which are encoded into a compressed code string called an agent genome. Sites have a list containing the identifiers of all other sites, called the unity, that is instantiated when the agent is created from the agent genome. As implemented, an agent genome is represented as a tuple of objects, having the following representative form:

[digital signature, timestamp, agent model-id, support information, {(site count1, genelist1), (site count2, genelist2) ... }]. (2)

Each agent genome can be signed with a certified digital signature to prevent tampering, and can include a creation timestamp, model number, support information identifying the designer, and contact information for the support organization. The final segment of the agent genome is a list of site codes containing the genes for each kind of site. A site count determines the multiplicity of the site class. Genelist determines the structure and function of the site. Agent genomes are downloaded into special receiving programs called the genesis site, which validate the agent genome's signature (for example, a digital signature) and evaluate the genes to produce the agent's sites. Once the agent is created, sites become active and begin performing housekeeping functions, interacting with each other and with the agent's environment. The original genesis site then is destroyed by the agent to prevent new agents from being formed in the occupied memory space.

Note that one intelligent agent can reproduce (i.e., give birth to) all other intelligent agents, thus can allow intelligent agent generation on multiple, distributed processors.

The general agent framework of the present invention can provide the following capabilities: architecture partitioning with sites to facilitate multi-processor implementation of agents; creation of an agent from site components with the structure given in representative form (1); homeostatic control mechanisms for an agent provided through housekeeping functions; distributed agent architecture with sensation, perception, action, and deliberation sites; capture of agent design in the genome structure given in (2); enablement of extensions to the genotype through the genome structure given in (2); agent creation and vitalization through a zygogenic process; and protection of the agent genome with a digital signature.

Adaptive Architecture for an Intelligent Agent

FIG. 1 is a diagram depicting an adaptive architecture for an intelligent agent with a connecting nexus according to the present invention. Adaptive architecture 20 in FIG. 1 comprises reflexive component 21, elaboration sub-component 22, association sub-component 23, nexus 24, and deliberator component 25. Nexus 24 comprises elaboration sub-component interface 26 and association sub-component interface 27. Nexus 24 also can comprise intercessory feedback control (not shown).

Elaboration sub-component interface 26 integrates association sub-component 23 and reflexive component 21. Association sub-component interface 27 integrates elaboration sub-component 22 and deliberator component 25. The inclusion of elaboration sub-component interface 26 and association sub-component interface 27 in nexus 24 provides an intercessory feedback mechanism between reflexive component 21 and deliberator component 25.

Adaptive architecture 20 provides a structure, comprising reflexive and deliberator components, for distributed intelligent agents. Distributed intelligent agents respond to stimuli within the learning structure of adaptive architecture 20.

The present invention provides stimulus evaluation and adaptation for one or more intelligent agents leading to action with adaptive architecture 20 within a network environment. Policies and protocols for sensing, classifying, and reflecting are implemented by a collection of secure and distributed intelligent agents responding to stimuli according to a goal defined by policies and procedures (for example, security and access policies for transactions over one or more computers).

Adaptive Architecture with Intelligent Agent Learning-Reflection

Figure 2:
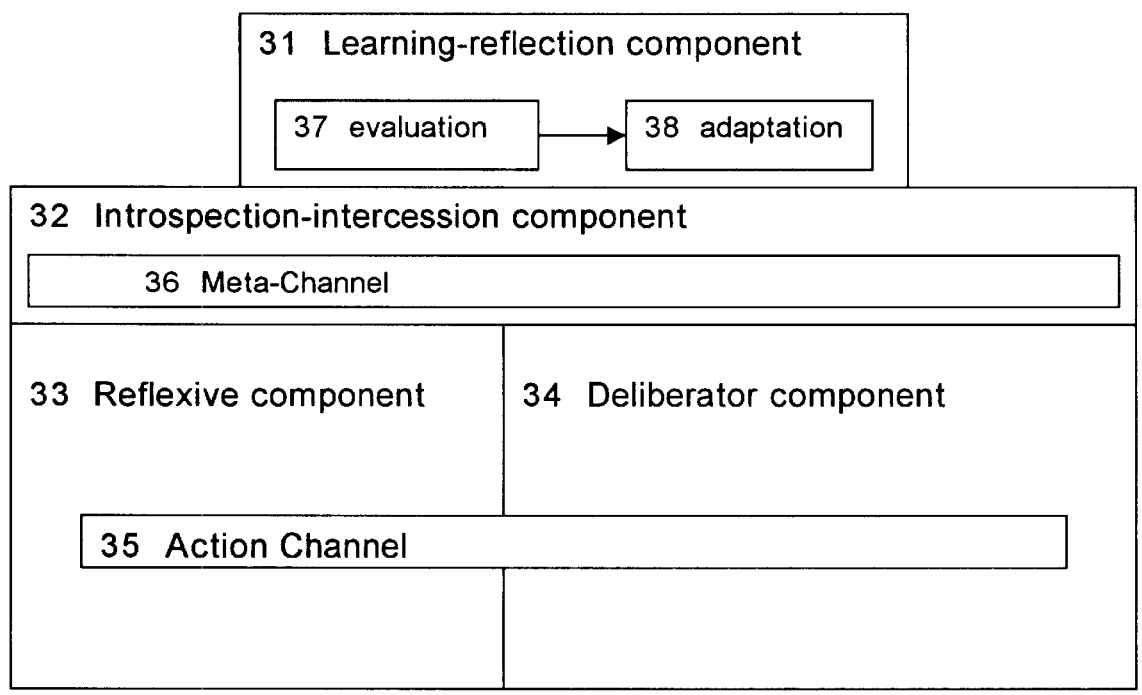
FIG. 2 is a diagram depicting relationships between high-level adaptive architecture components of the invention.
Figure 2:
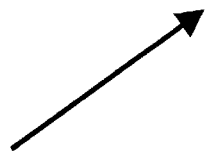

FIG. 2 is a diagram depicting relationships between high-level agent architecture components of the invention. Adaptive architecture 30, depicted in FIG. 2 for one intelligent agent, comprises learning-reflection component 31, introspection-intercession component 32, reflexive component 33, deliberator component 34, and action channel 35. Introspection-intercession component 32 comprises meta-channel 36. Learning-reflection component 31 comprises evaluation 37 and adaptation 38.

Reflexive component 33 has sensation, perception, and reflex layers and is a complete two-layer reflexive intelligent agent that can be programmed for stand-alone operation. Deliberator component 34 has association and deliberation layers and implements model-based, goal-directed reasoning and planning functions, with special interfaces to reflexive component 33 to obtain state information, to dispatch actions, and for programming reflexive agent 33, and to feed back updated expectations to reflexive component 33.

Introspection-intercession component 32 implements meta-reasoning—reasoning about the agent's structure and functions, that enables restructuring of the subsystem components at run-time to improve efficiency; intelligent, integrated fault detection and recovery; and performance measurements through introspective and intercessory methods.

Component classes and methods (for example, upstream processes that process before a given process) can be inspected and re-programmed through commands issued by deliberator component 34 through meta-channel 36. Meta-channel 36 spans all subsystems and can implement a common interface for the exchange of meta-data. Meta-channel 36 is itself an intelligent reasoning element that evaluates, filters, and routes meta-data according to a model of the adaptive architecture for an intelligent agent. Meta-channel 36 coordinates information among architecture components and can re-program itself "on the fly" during execution.

Performance signals (not shown) from adaptive architecture 30 components are relayed through meta-channel 36 to an evaluation 37 stage with measurement and assessment in learning-reflection component 31. Information is integrated and a vector of performance metrics that summarizes the various functions of the intelligent agent is created and shared through meta-channel 36. The synoptic measurements are passed into a re-programming unit, in adaptation 38 stage in learning-reflection component 31, that issues programming macro commands to architecture 30 components through meta-channel 36.

Intercessory feedback controls enable precise, fine-grained re-programming of the sensation layer of reflexive component 33 by the higher-level reasoning elements of learning-reflection component 31 and deliberator component 34. Intercessory feedback controls can comprise: various control parameters, meta-data filters, expectation mechanisms, and attentional mechanisms, discussed in additional detail in the context of FIG. 3.

Learning-reflection component 31 of the present invention provides the following capabilities: evaluation stage that analyzes, integrates, and summarizes performance measurements from subsystems; and adaptation stage that re-programs subsystem classes and methods based on performance measurements.

Action channel 35 provides a common means of registration for the intelligent agent's intentions to an executive action sub-component that allows introspection and enables the agent to correlate its actions with perceived changes in the state of the environment. The action channel registers agent intentions, such as: intentions for future direction, for present direction, and action (now). FIG. 2 is further discussed in relation to FIGS. 3 and 4.

Adaptive Architecture Details with Reflexive Component

Figure 3:
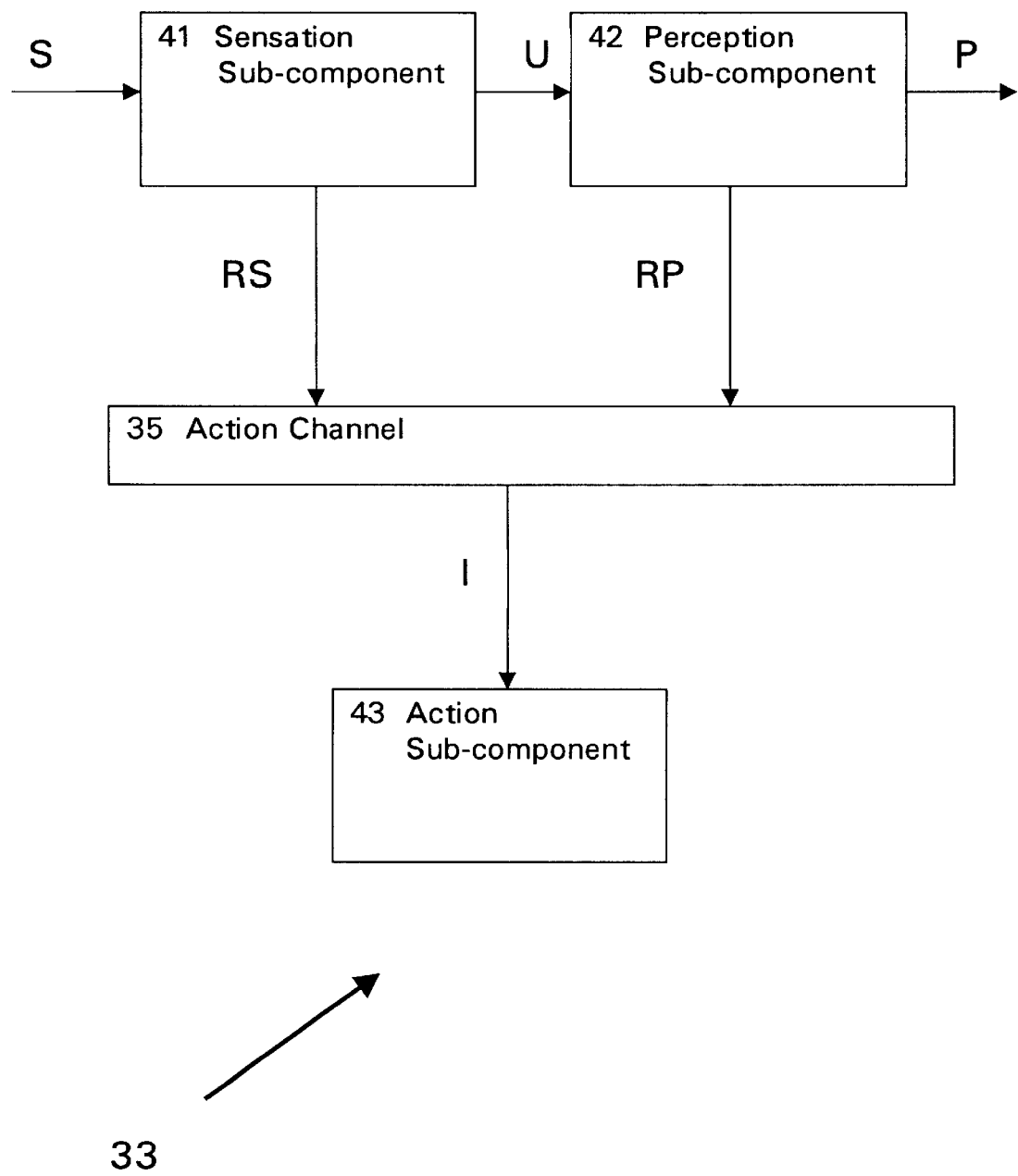
FIG. 3 is a detailed diagram depicting sub-components in a reflexive component of the present invention.

FIG. 3 is a detailed diagram depicting sub-components in a reflexive component of the present invention. Reflexive component 33 comprises sensation sub-component 41, perception sub-component 42, and action sub-component 43. Perception sub-component 42 can comprise elaboration sub-component 22 (shown in FIG. 1).

Raw stimuli S arrive from a world environment through sensors or communications ports and are converted into primitive stimulus data (for example, string and binary data) by sensation sub-component 41. Raw stimuli S can be pre-classified and labeled according to type, or classified as unknown. The type, raw stimulus S, and any meta-data are organized into unit stimulus U object according to a sensory policy in effect when raw stimulus S is detected. Meta-data can include, but is not limited to, time of stimulus event, source of stimulus, receiving port or sensor, size and intensity of stimulus, probability of pre-classification label, a measure of stimulus novelty, security attributes, and other descriptive information distinct from raw stimuli S itself. Sensory processing policy is determined by deliberator component 34 and learning-reflection component 31 of FIG. 2 and is transmitted to sensation sub-component 41 through meta-channel 36 of FIG. 2. Sensory policy includes control parameters with examples that include: sampling rates, reporting thresholds, channel timeouts, buffer sizes, meta-data filters that pass or reject raw stimulus S prior to or after pre-classification, as well as sensory expectation rules that match stimulus patterns that are either predicted by models in deliberator component 34 or are normative to the agent's environment. Special sensory expectations can be programmed by action sub-component 43.

Matched sensory expectations can be further filtered according to an attentional policy that down-selects only those matching unit stimuli that have current priority (for example, that are within the agent's current focus of attention, as determined by deliberator component 34 and learning-reflection component 31 controlling goal-directed reasoning and learning). Unit stimuli U and matching expectations that are not selected for immediate attention can be shunted and isolated for special analysis outside normal sensory processing policy, or can be dropped, depending on the sensory policy. The various control parameters, meta-data filters, expectation and attentional mechanisms constitute intercessory feedback controls that enable precise, fine-grained re-programming of sensation sub-component 41 by higher-level reasoning components—deliberator component 34 and learning-reflection component 31. A benefit is efficient use of computational resources in a stimuli-rich environment having only some stimuli important to the agent's goals. Another benefit is rapid and efficient rejection of dangerous stimuli based on meta-data or stimulus type, effectively preventing propagation of foreign bodies into the agent (for example, software viruses sent on communications ports). Shunting and isolation can be important in handling stimuli of undetermined type. These stimuli can be examined by learning-reflection component 31 for dangerous characteristics or to attempt to induce new categories of stimuli.

Selected unit stimulus U is passed to perception sub-component 42, where the data content is further classified and elaborated into specific features of unit stimulus U according to the class of unit stimulus U and the current perceptual policy for processing stimuli of that class. Perceptual policies, can be re-programmed dynamically by deliberator component 34 or learning-reflection component 31, include patterns for selective elaboration, the process of focusing on the specific features of unit stimulus U that are relevant to the agent's current goals while ignoring features that are irrelevant to the goal. Selective elaboration can improve efficiency of perceptual processing by expending computational resources exclusively on the relevant and salient unit stimulus U features, a mechanism that provides the most advantage for large-complex stimuli.

Percept P represents highly organized sensory information regarding the occurrence of well-known objects or events in the world environment. Perceptual processing has expectation and attentional mechanisms similar to those of sensation sub-component 41 that may match elaborated features and down-select percepts P for further processing by association sub-component 51 and deliberation sub-component 53, discussed later for FIG. 4. Policy options include: buffering, delay, re-submission, shunting and isolation, and discarding of percepts P.

Reflex actions based on raw stimuli RS and reflex actions based on percepts RP implement the reactive system perception-action pairs.

Raw stimuli reflex actions RS and percept reflex actions RP are dispatched to action channel 35 if certain features of unit stimulus U or percept P are matched by reflex action rules. These rules can be normative (for example, pre-programmed at agent creation) or dynamically re-programmed by deliberator component 34 and learning-reflection component 31 mechanisms through a reflexive policy, another component of the intercessory feedback control system. Unit stimuli U or percepts P sent to executive action sub-component 43 activate reflex actions RS and RP that are sent as intentions I and are immediately and unconditionally executed. Executed actions can cause the creation of sensory expectations in sensation sub-component 41 that capture predicted events in the agent's environment caused by the reflex action. This enables agent proprioception, the determination of local state resulting from actions.

Reflexive component 33 is a complete two-layer reactive agent capable of complex pattern recognition and responses. It can be used in a stand-alone manner without deliberator component 34 or learning-reflection component 31. In stand-alone mode, percept P cannot be passed on for further processing; raw stimuli reflex actions RS and percept reflex actions RP are the ultimate result of a stimulus.

Reflexive component 33 of the present invention provides the following capabilities: effective partitioning of afferent information processing steps; partitioning of agent functions that enable efficient multiple reflexive behaviors activated by both stimuli and percepts; mechanism for recognizing and isolating dangerous sensory inputs; mechanism for efficient and flexible partial elaboration of complex stimuli; mechanism for proprioception of agent actions through sensory expectations; mechanism for efficient selective attention at both sensation sub-component and perception sub-component stages; mechanism for efficient focus-of-attention at both sensation sub-component and perception sub-component stages; partitioning of agent functions to enable efficient gradual allocation of computational resources to stimulus processing; mechanism for intercessory feedback control of the reflexive agent by higher-level reasoning components; mechanism for an efficient consistent re-programming interface through a meta-channel; mechanism for an efficient consistent exchange of meta-data through a meta-channel; effective partitioning of efferent information (actions) processing stages spanning an action channel; and mechanism for criticizing stimulus inputs at various stages or processing to determine relevance and salience.

Agent Architecture Details with Deliberator Component

Figure 4:
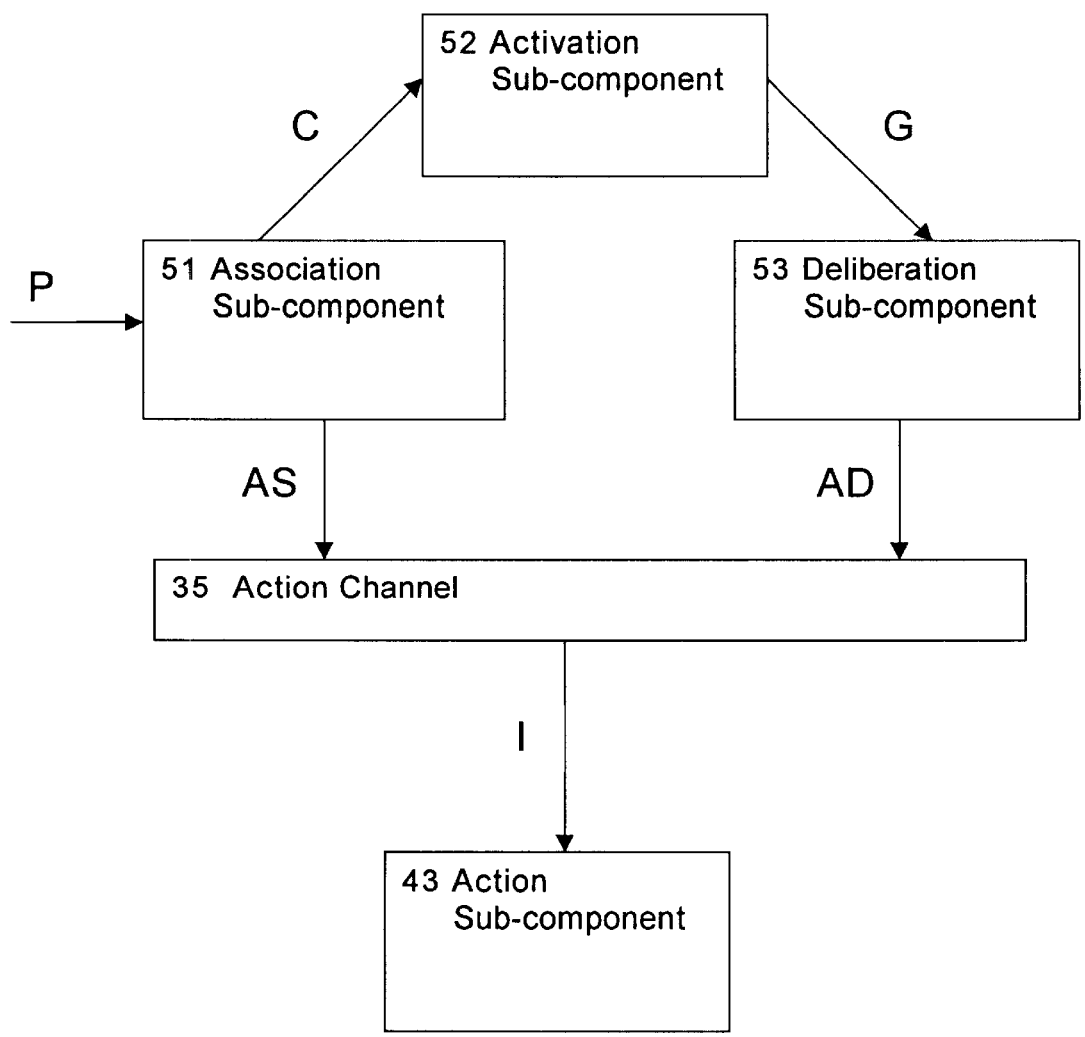
FIG. 4 is a diagram depicting sub-components in a deliberator component of the present invention.

FIG. 4 is a diagram depicting sub-components in a deliberator component of the present invention. Deliberator component 34 comprises association sub-component 51, activation sub-component 52, deliberation sub-component 53, and action sub-component 43. Action sub-component 43 can also be part of reflexive component 33.

Deliberator component 34 implements more complex reasoning involving modeling of the agent's world, constraint satisfaction, and planning. Percepts P are matched with higher-level structures called schemata C in association sub-component 51 stage. Schemata C represent concepts modeled by the agent relevant to the agent's current perceptions of the world. Schemata C represent collections of percepts P that instantiate a category of object, such as temporal events, sequences of percepts P organized in time, or a-temporal taxonomies of objects. Percepts P that match active schemata C are interned in schemata C. Patterns of interned percepts P can cause intention I to be issued from action channel 35 (see FIG. 2), or an evaluation process to be activated that determines whether a new goal G is created or an existing goal G is continued. Planning and plan execution stages in deliberation sub-component 53 are activated with selected goal G, and goal G is dispatched for satisfaction. If a new goal G is created, the planner constructs a candidate plan to achieve the goal, if possible, and generates a new schemata C, a sequence of intentions I to act, and concomitant changes to the world state that are expected to result from realized intentions I. Intentions I are sent to action sub-component 43 for execution (also shown in FIG. 3), while the predicted changes create updated sensory and perceptual expectations that can influence sensory, perceptual, and reflexive policies in force in reflexive component 33.

Intentions I resulting from association AS and intentions I resulting from deliberation AD are delivered to executive action sub-component 43 through action channel 35, which is common to reflexive component 33, deliberator component 34, and learning-reflection component 31. Upon successfully achieving the intended action, the component that dispatched the intention is notified. Action sub-component 43 can be the same component as shown in FIG. 3.

Deliberator component 34 of the present invention provides the following capabilities: partitioning of agent functions that enable efficient motivated reasoning (in deliberation sub-component 53); mechanism for capturing intentional actions; mechanism for creating goals in response to state information (closed schemata); mechanism for continuing the processing of deferred goals in response to state information (closed schemata); meta-channel mechanism that facilitates global reasoning about agent state and functions; mechanism for generating policies for feedback programming of reflexive, sensory, and perceptual mechanisms; meta-channel mechanism that enables effective reasoning about internal faults; mechanism for notification of completion of intended actions; and mechanism for matching percepts P with schemata C.

Method for an Agent Architecture

FIGS. 5–8 are flow diagrams of steps in the method of using an agent architecture. Details of some of the components and sub-components were discussed previously in the context of FIGS. 2, 3, and 4.

Figure 5:
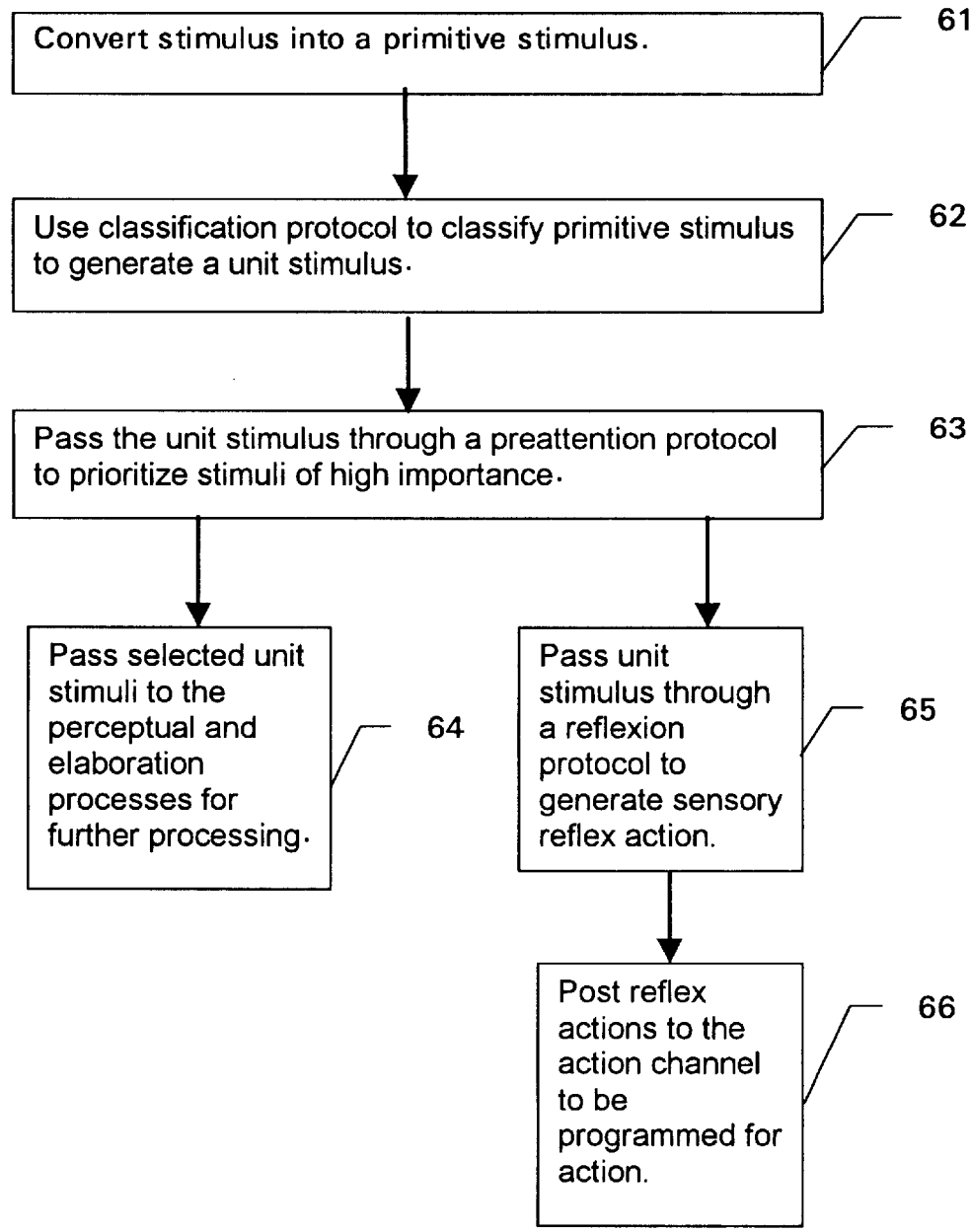
FIG. 5 is a flow diagram of a method according to the present invention of a sensation process within an agent architecture.

FIG. 5 is a flow diagram of a method according to the present invention of a sensation process within an agent architecture. FIG. 5 has method details on a sensation process for architecture components discussed previously in the context of sensation sub-component 41 in FIG. 3.

Convert received stimulus into a primitive stimulus, step 61. The stimulus can be received from a world environment through sensors or communications ports (see stimulus S in FIG. 3) and are converted into a process-usable format, such as string, binary, or other data format. Stimulus examples include computer information requests, requests to connect to a computer network node, detection of an obstacle by a mobile robot, and many other sensed or communicated data.

Use a classification protocol to classify the primitive stimulus against known type classifiers to generate a unit stimulus, step 62. The classification protocol is based on an identified pre-classification policy. Within this step, raw stimuli are pre-classified, then the type label, raw data, and any associated meta-data are organized and output as a unit stimulus, as discussed for FIG. 3 with unit stimulus U. A reinforcement protocol, with examples and following a reinforcement policy, can feed information into the classification protocol.

Pass the unit stimuli through a preattention protocol to prioritize stimuli of high importance, according to a preattention policy, step 63. Some-unit stimuli that are normative to the agent's environment can be discarded at this point.

Figure 6:
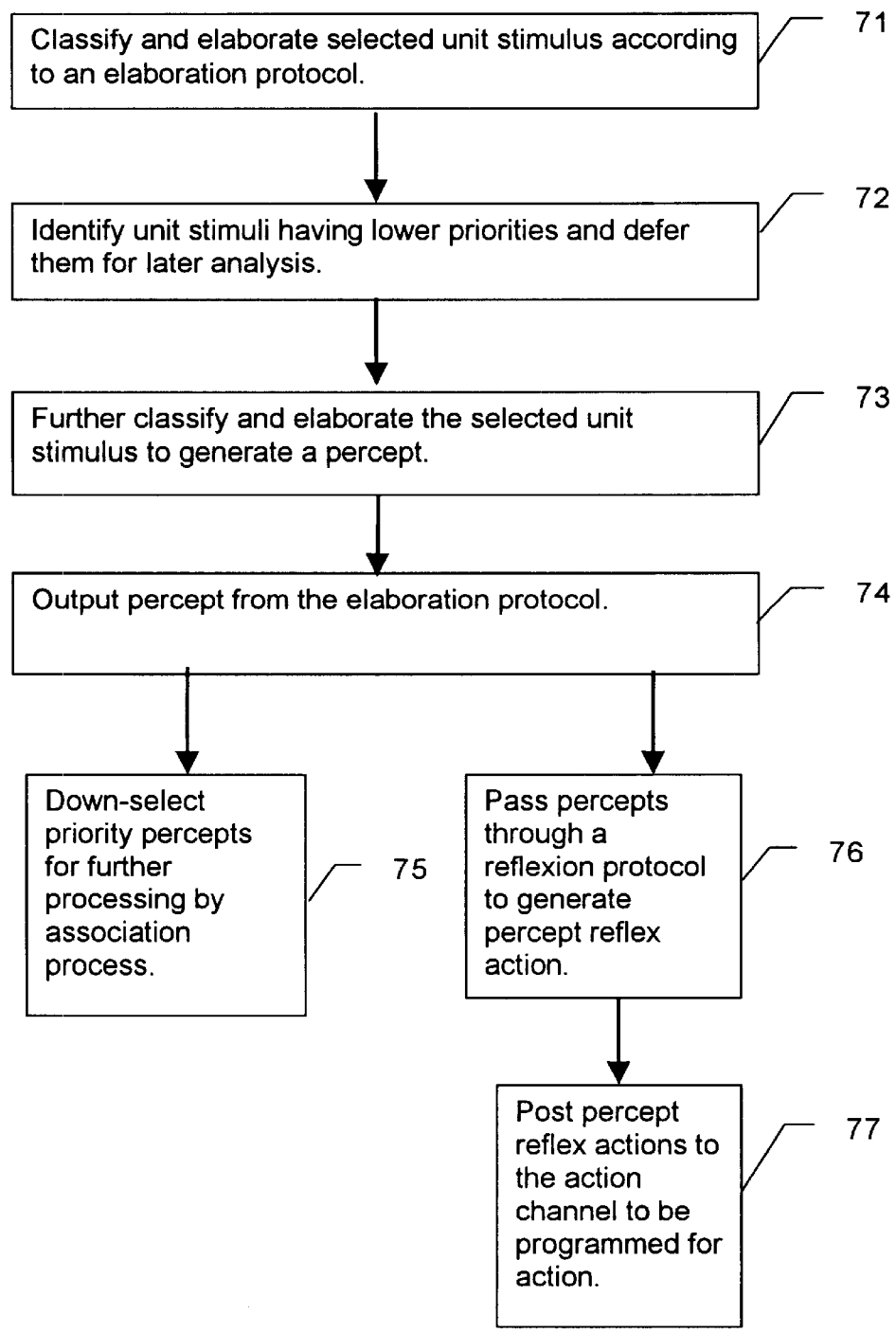
FIG. 6 is a flow diagram of a method according to the present invention of an elaboration process within an agent architecture.

Route unit stimuli to one of the following two steps:

Pass selected unit stimuli to the perceptual and elaboration process, described in FIG. 6, for further processing, step 64.

Or, pass unit stimuli that match reflexion policy and special sensory expectations for reflex action through a reflexion protocol to generate a sensory reflex action, step 65.

Post sensory reflex actions to the action channel to be programmed by the action sub-component, step 66, for implementation of reflex actions based on the selected unit stimulus. (See reflex actions based on raw stimuli RS in FIG. 3.)

FIG. 6 is a flow diagram of a method according to the present invention of an elaboration process within an agent architecture. FIG. 6 has method details on an elaboration process for architecture components discussed previously in the context of elaboration (as part of perception sub-component 42 in FIG. 3).

Classify and elaborate selected unit stimulus, from the sensation process in FIG. 5, according to an elaboration protocol, step 71. Further classify and identify the stimulus according to known type methods and elaboration policy. Selective elaboration mechanisms impart organization and identify features of the stimulus.

Identify unit stimuli having lower priorities and defer them for later analysis, step 72.

Pass through an identification protocol to further classify the selected unit stimulus according to known entity models, and elaborate the classified unit stimulus using the elaboration protocol to generate a percept, step 73. Utilize identification policies in the identification protocol and feed the results back into the elaboration protocol of step 71. Update entity models as new identification information becomes available.

Output percepts from the elaboration protocol, step 74. A percept represents highly organized sensory information regarding the occurrence of well-known objects of events in the world environment. One example of a percept is a Web page containing organized information.

Route percepts into one of the following two steps:

Down-select priority percepts for further processing by an association process, step 75.

Or, pass percepts that match reflexion policy and percept-action expectations for reflex action through a reflexion protocol, step 76, to generate a percept reflex action.

Post percept reflex actions to the action channel to be programmed by the first action sub-component, step 77, for implementation of reflex actions based on the selected percept. (See reflex actions based on percepts RP in FIG. 3.)

Figure 7:
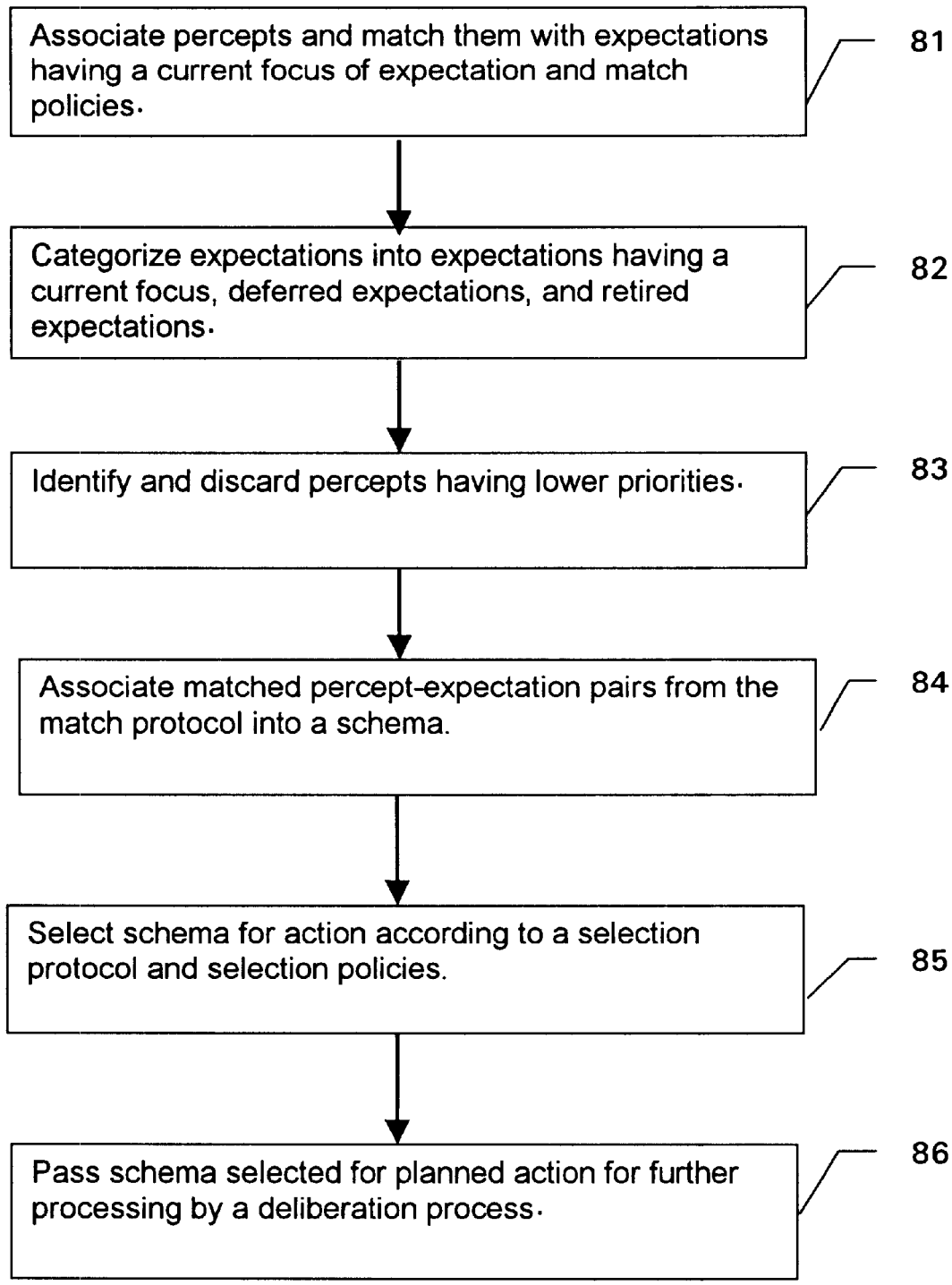
FIG. 7 is a flow diagram of a method according to the present invention of an association process within an agent architecture.

FIG. 7 is a flow diagram of a method according to the present invention of an association process within an agent architecture. FIG. 7 has method details on an association process for architecture components discussed previously in the context of association sub-component 51 in FIG. 4.

Associate percepts received from the elaboration process in FIG. 6 according to a match protocol and match them with expectations having a current focus of expectation and match policies, step 81. Note that a stimulus is related to a percept, which is associated with an expectation. Loop through unmatched percepts and attempt to match them with expectations.

Pass the expectation through an attention protocol, according to an attention policy, step 82. The attention protocol can receive a new expectation from a deliberation process (discussed later for FIG. 8) and categorize the expectation into expectations having a current focus, deferred expectations, and retired expectations.

Identify and discard percepts having lower priorities, step 83.

Associate matched percept-expectation pairs from the match protocol in step 81 into a schema, step 84.

Select schema for a planned action according to a selection protocol and selection policies, step 85. Retire the expectations associated with the selected schema (built from received percept).

Pass schema selected for planned action for further processing by a deliberation by process, step 86.

Figure 8:
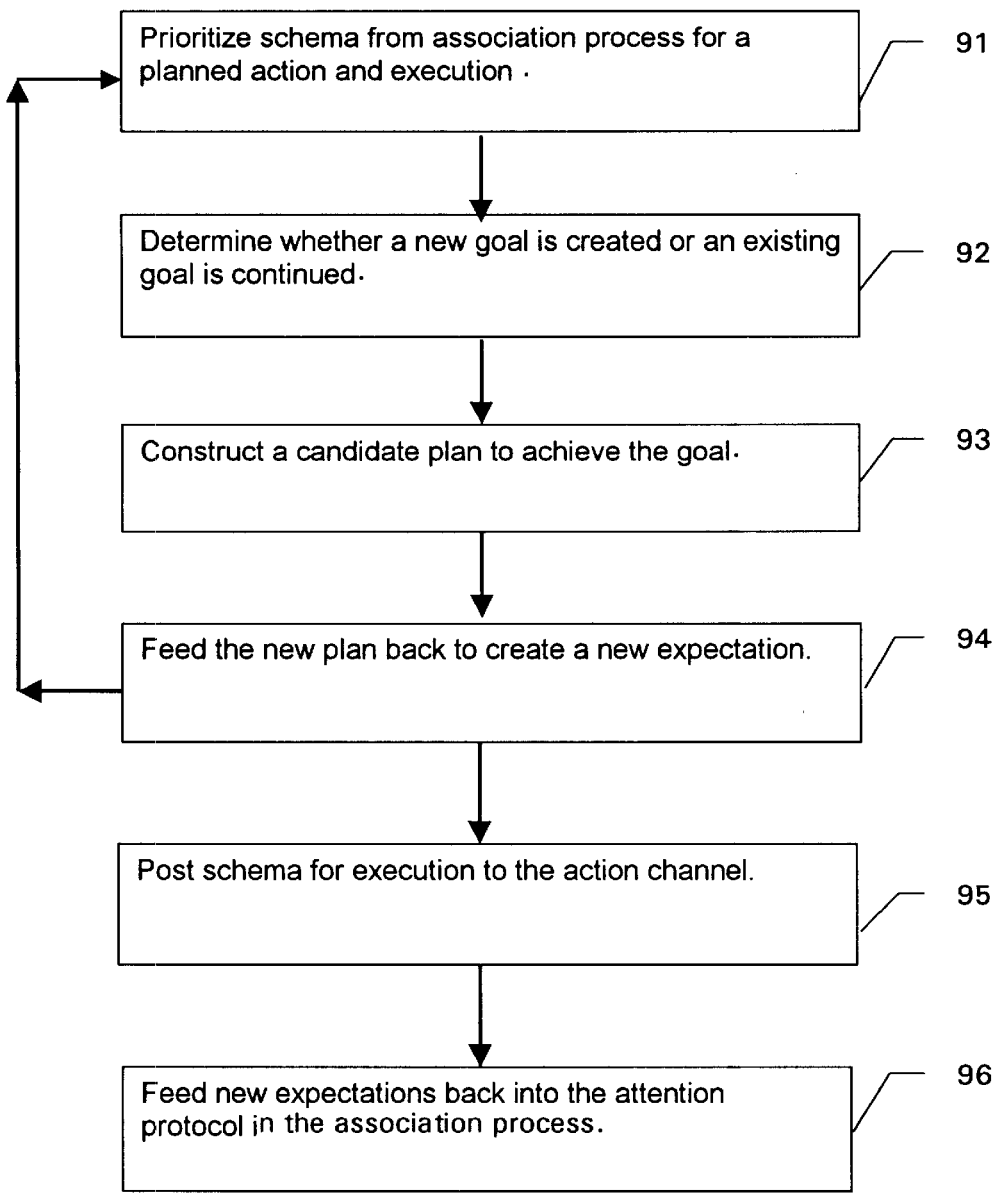
FIG. 8 is a flow diagram of a method according to the present invention of a deliberation process within an agent architecture.

FIG. 8 is a flow diagram of a method according to the present invention of a deliberation process within an agent architecture. FIG. 8 has method details on an deliberation process for architecture components discussed previously in the context of deliberation sub-component 53 in FIG. 4.

Take schema received from the association process in FIG. 7 and prioritize the schema for planning and execution according to an execution protocol and execution policies, step 91.

Determine whether a new goal is created or an existing goal is continued, according to a goal directing protocol and the known goal, step 92.

Execute a planning protocol, step 93, to construct a candidate plan to achieve the selected goal according to a planning policy and known domains. Planning protocol generates a plan with a new schema, a sequence of intentions to act, and expected changes to the world state environment.

Feed the new plan back to execution protocol to create new expectations, step 94. The predicted changes create new sensory and perceptual expectations that can influence sensory, perceptual, and reflexive policies in force. (See reflexive component 33 in FIGS. 2 and 3.)

Post schemata for execution (for example, those planned actions resulting from the association action) to the action channel, step 95. (See percepts P, schemata C, and intentions I resulting from association AS in FIG. 4.) Post subsequent intentions to act and planned actions to the action channel to be programmed by action sub-component 43 for execution, for implementation of planned actions based on the selected schemata. (See deliberation sub-component 53 and intentions I resulting from deliberation AD in FIG. 4.)

Feed new expectations back into the attention protocol, step 96. (See attention protocol of step 82 in FIG. 7.)

Nexus and Intercessory Feedback Control Example

As discussed previously, a nexus according to the present invention, can comprise interfaces and feedback control. Rather than a distinct component, the nexus is pervasive in its interfaces and can coordinate the re-programming of an adaptive architecture to inter-operatively update the reflex action. The nexus comprises intercessory feedback control. Deliberator component 25 (shown in FIG. 1) can re-program the adaptive architecture through the intercessory feedback control.

In FIG. 2 and the associated discussion, commands issued by deliberator component 34 through meta-channel 36 can trigger re-programming of component classes and methods (for example, upstream processes that process before a given process). For example, while processing an association sub-component (shown in FIG. 4), deliberator component 34 can re-program the association sub-component through intercessory feedback control (not shown), which also can coordinate the re-programming of processes upstream (for example, sensation sub-component (shown in FIG. 3) and elaboration sub-component 22 (shown in FIG. 1)) with the association sub-component to inter-operatively update a reflex action. As another example, while processing a deliberation sub-component, a deliberator component can re-program the deliberation sub-component through intercessory feedback control, which also can coordinate the re-programming of processes upstream (for example, sensation sub-component, elaboration sub-component, association sub-component) with the deliberation sub-component to inter-operatively update a reflex action. Intercessory feedback control comprises feedback policy which can set new upstream policies associated with processes upstream.

Nexus 24 (shown in FIG. 1) comprises sub-component interfaces (elaboration sub-component 26 and association sub-component interface 27, shown in FIG. 1) and intercessory feedback control (not shown). Intercessory feedback controls enable precise, fine-grained re-programming of the sensation layer of reflexive component 33 by the higher-level reasoning elements of learning-reflection component 31 and deliberator component 34. Intercessory feedback controls can comprise: various control parameters, meta-data filters (for example, policies such as a preattention policy, which can determine what to examine further and what to ignore, then implement a reflex action), expectation mechanisms, and attentional mechanisms, discussed in additional detail in the context of FIG. 3.

Intercessory feedback control can set upstream policies, which means that a new policy object is put in place. In the present invention, a policy can tell how a desired function be preformed and a protocol can be the object-oriented program that carries out the function.

Reflexive responses are rapid responses to stimuli. Take an example where an adaptive architecture has a goal to function as a Web server. An incoming stimulus can be associated with expectation objects according to patterns for the stimulus in a percept. For example, a sensation response can filter according to address. An elaborator can elaborate features the expectation object is looking for and form a percept (a description of an event)—for example, detect and determine what stimuli from a given address are attempting to do, then identify whether that particular attempt has occurred previously. A reflexion protocol can take reflex actions.

Deliberator responses are according to one or more goals, where new goals can be added (for example, learned by the adaptive architecture) or deleted (for example, unlearned reflexes). Continuing the Web server example, the percept can be associated with an expectation to form a schema. For example, continuing attempts for access for a particular address can be a Web server attack. The adaptive architecture can then determine what to do about the attack. For example, an execution protocol can execute a security plan. Intercessory feedback control can set upstream policies to program the elaborator, to initiate the reflexion protocol to take a reflex action, and to re-program reflexion policy. All upstream policies can be set and re-programmed by the deliberator, through intercessory feedback control.

System Thread Example with Packet Sniffing and Generation

Figure 9:
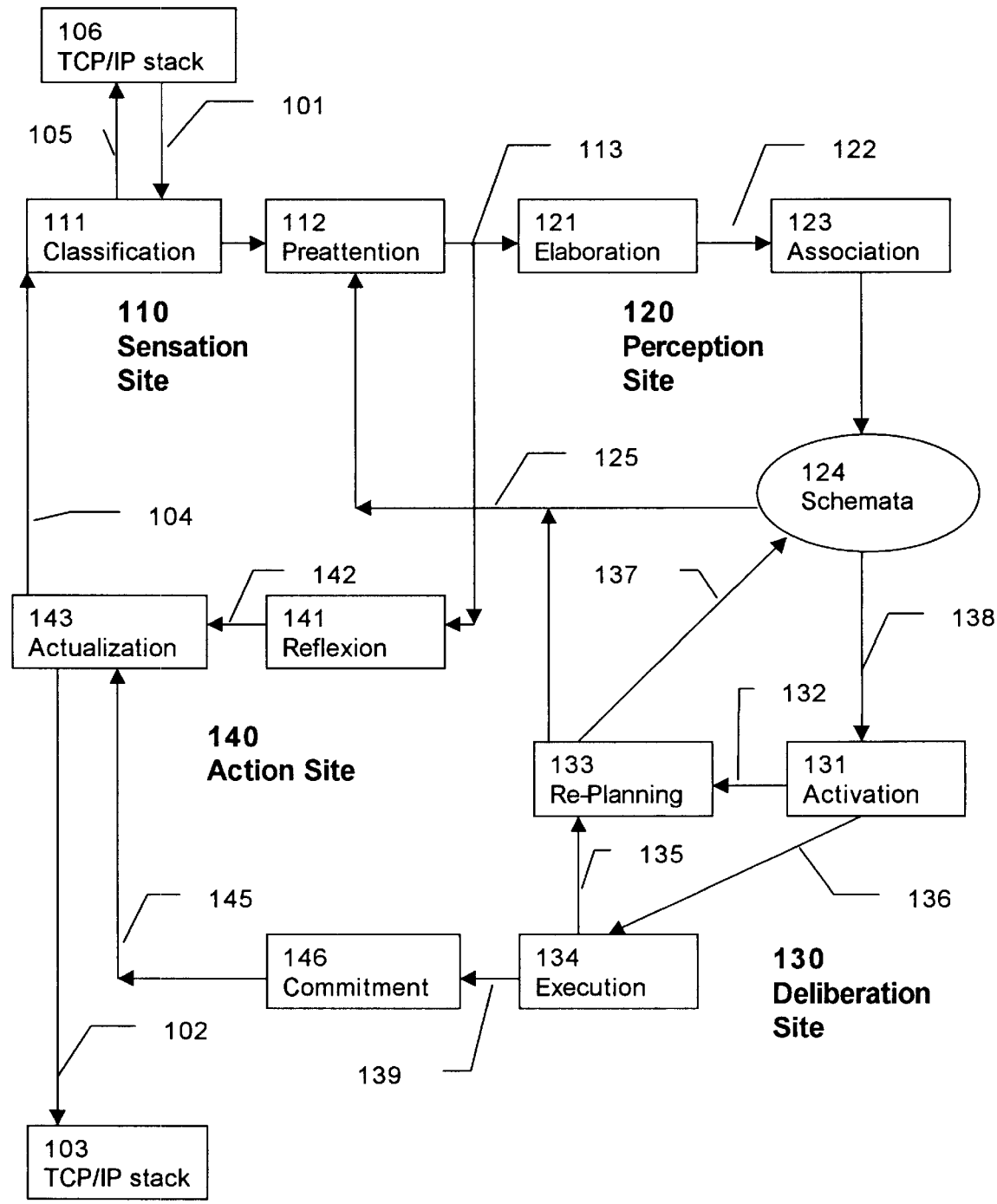
FIG. 9 is a diagram showing an agent architecture with sensation, perception, action, and deliberation sites.

The architecture method has been used with a system thread in an example application for packet sniffing and generation. FIG. 9 is a diagram showing an agent architecture with sensation, perception, action, and deliberation sites.

The world environment is a computer network environment with packet handling through a TCP/IP stack under a filtering policy.

Sensation site 110 takes incoming packet 101 through classification 111 and preattention 112 stages to output unit stimulus 113. Unit stimulus 113 is input to reflexion 141 to generate reflex action 142, which is input to actualization 143. Actualization 143 outputs information packets 102 to TCP/IP stack 103 and outputs self-expectations 104 to classification 111 within sensation site 110. Classification 111 feeds back filtering policy 105 back to TCP/IP stack 106.

Perception site 120 takes unit stimulus 113 through elaboration 121 to output percept 122, then through association 123 to output schemata 124. Schemata 124 is fed back as sensory policy 125 to preattention 112 within sensation site 110.

Deliberation site 130 takes schemata 124 as individual schema 138 through activation 131 to output goal 132 to re-planning 133, and to post output 136 to execution 134. Re-planning 133 takes goal 132 and outputs plan 135 which is subsequently posted to execution 134. Re-planning 133 also feeds back information 137 to schemata 124 and as sensory policy 125 to preattention 112 within sensation site 110.

Action site 140 inputs intention 139 from execution 134 to commitment 146 and outputs an intentional action 145 for actualization 143. Actualization 143 outputs information packets 102 to TCP/IP stack 103 and outputs self-expectations 104 to classification 111 within sensation site 110.

The above system thread example with packet sniffing and generation is merely one example of a use of an adaptive architecture according to the present invention. Other examples exist in areas as diverse as computer security, transactions over information networks, and robot agent searches and goal finding with intelligent agents.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. An adaptive method for controlling an intelligent agent to respond to a stimulus according to a goal, the method implemented as an adaptive architecture running on at least one processor, comprising:

a) generating a reflex action to the stimulus by the intelligent agent;

b) generating a planned action to the stimulus by the intelligent agent, according to the goal; and c) coordinating the reflex action generation and the planned action generation by a nexus to re-program the adaptive architecture, wherein the nexus comprises an intercessory feedback control.

2. The adaptive method of claim 1, wherein coordinating the reflex action generation and the planned action generation by a nexus to re-program the adaptive architecture, comprises inter-operatively updating the reflex action coordinated by the intercessory feedback control.

3. The adaptive method of claim 1, wherein coordinating the reflex action generation and the planned action generation by a nexus to re-program the adaptive architecture, comprises:
   a) integrating through a percept the reflex action generation and an association to a schema for generating the planned action; and
   b) integrating through the schema the planned action generation and an elaboration to the percept.

4. The adaptive method of claim 1, wherein:
   a) generating the reflex action comprises:
      i) elaborating the stimulus;
      ii) forming a percept of the stimulus; and
   b) generating the planned action comprises associating the percept to a schema;
   c) wherein the coordination integrates the elaborated stimulus with the generated planned action.

5. The adaptive method of claim 4, wherein the step of coordinating comprises feeding the percept back through the nexus to the step of generating the planned action.

6. The adaptive method of claim 1, wherein the intercessory feedback control comprises a sensation policy, wherein:
   a) the step of generating the reflex action comprises:
      i) filtering the stimulus, according to the sensation policy; and
      ii) organizing the stimulus; and
   b) the step of coordinating comprises triggering the reflex action to the classified stimulus.

7. The adaptive method of claim 6, wherein the step of coordinating further comprises updating the sensation policy through the intercessory feedback control.

8. The adaptive method of claim 6, wherein the intercessory feedback control further comprises an elaboration policy, wherein the step of generating the reflex action further comprises:
   a) forming a percept of the organized stimulus; and
   b) elaborating the percept, according to the elaboration policy.

9. The adaptive method of claim 8, wherein the step of coordinating further comprises updating the elaboration policy through the intercessory feedback control.

10. The adaptive method of claim 8, wherein the intercessory feedback control further comprises an association policy, wherein the step of generating the planned action comprises associating the percept to a schema, according to the association policy.

11. The adaptive method of claim 10, wherein the step of coordinating further comprises updating the association policy through the intercessory feedback control.

12. The adaptive method of claim 10, wherein the intercessory feedback control further comprises a deliberation policy, wherein the step of coordinating further comprises executing a plan, according to the deliberation policy.

13. The adaptive method of claim 12, wherein the step of coordinating further comprises updating the deliberation policy through the intercessory feedback control.

14. The adaptive method of claim 10, wherein the intercessory feedback control further comprises a feedback policy, wherein the step of coordinating further comprises setting a new upstream policy, according to the feedback policy.

15. The adaptive method of claim 1, wherein the intercessory feedback control comprises an elaboration policy, wherein the step of generating the reflex action comprises:
   a) forming a percept of the stimulus; and
   b) elaborating the percept, according to the elaboration policy.

16. The adaptive method of claim 15, wherein the step of coordinating comprises updating the elaboration policy through the intercessory feedback control.

17. The adaptive method of claim 1, wherein the intercessory feedback control comprises an association policy, wherein;
   a) the step of generating the reflex action comprises forming a percept of the stimulus; and
   b) the step of generating the planned action comprises associating the percept to a schema, according to the association policy.

18. The adaptive method of claim 17, wherein the step of coordinating comprises updating the association policy through the intercessory feedback control.

19. The adaptive method of claim 1, wherein the intercessory feedback control comprises a deliberation policy, wherein the step of generating the planned action comprises executing a plan, according to the deliberation policy.

20. The adaptive method of claim 19, wherein the step of coordinating comprises updating the deliberation policy through the intercessory feedback control.

21. The adaptive method of claim 1, wherein the intercessory feedback control comprises a feedback policy, wherein the step of coordinating further comprises setting a new upstream policy, according to the feedback policy.

22. The adaptive method of claim 1, wherein the nexus further comprises a learning-reflection intercessory feedback control, wherein the method further comprises:
   a) assessing a performance metric of the intelligent agent; and
   b) adaptively re-programming the adaptive architecture to modify the performance metric, through the learning-reflection intercessory feedback control.

23. An adaptive method for controlling a plurality of software intelligent agents to respond to a stimulus according to a goal, the method implemented as an adaptive architecture running on one or more processors, the method for each intelligent agent comprising:
   a) generating a reflex action to the stimulus by the intelligent agent;
   b) generating a planned action to the stimulus by the intelligent agent, according to the goal; and
   c) coordinating the reflex action generation and the planned action generation by a nexus to re-program the adaptive architecture, wherein the nexus comprises an intercessory feedback control.

24. The adaptive method of claim 23, wherein coordinating the reflex action generation and the planned action generation by a nexus to reprogram the adaptive architecture, comprises inter-operatively updating the reflex action coordinated by the intercessory feedback control.

25. The adaptive method of claim 23, wherein coordinating the reflex action generation and the planned action generation by a nexus to reprogram the adaptive architecture, comprises:
   a) integrating through a percept the reflex action generation and an association to a schema for generating the planned action; and b) integrating through the schema the planned action generation and an elaboration to the percept.

26. The adaptive method of claim 23, wherein:
   a) generating the reflex action comprises:
      i) elaborating the stimulus;
      ii) forming a percept of the stimulus; and
   b) generating the planned action comprises associating the percept to a schema;
   c) wherein the coordination integrates the elaborated stimulus with the generated planned action.

27. The adaptive method of claim 26, wherein the step of coordinating comprises feeding the percept back through the nexus to the step of generating the planned action.

28. The adaptive method of claim 23, wherein the intercessory feedback control comprises a sensation policy, wherein:
   a) the step of generating the reflex action comprises:
      i) filtering the stimulus, according to the sensation policy; and
      ii) organizing the stimulus; and
   b) the step of coordinating comprises triggering the reflex action to the classified stimulus.

29. The adaptive method of claim 28, wherein the step of coordinating further comprises updating the sensation policy through the intercessory feedback control.

30. The adaptive method of claim 28, wherein the intercessory feedback control further comprises an elaboration policy, wherein the step of generating the reflex action further comprises:
   a) forming a percept of the organized stimulus; and
   b) elaborating the percept, according to the elaboration policy.

31. The adaptive method of claim 30, wherein the step of coordinating further comprises updating the elaboration policy through the intercessory feedback control.

32. The adaptive method of claim 30, wherein the intercessory feedback control further comprises an association policy, wherein the step of generating the planned action comprises associating the percept to a schema, according to the association policy.

33. The adaptive method of claim 32, wherein the step of coordinating further comprises updating the association policy through the intercessory feedback control.

34. The adaptive method of claim 32, wherein the intercessory feedback control further comprises a deliberation policy, wherein the step of coordinating further comprises executing a plan, according to the deliberation policy.

35. The adaptive method of claim 34, wherein the step of coordinating further comprises updating the deliberation policy through the intercessory feedback control.

36. The adaptive method of claim 32, wherein the intercessory feedback control further comprises a feedback policy, wherein the step of coordinating further comprises setting a new upstream policy, according to the feedback policy.

37. The adaptive method of claim 23, wherein the intercessory feedback control comprises an elaboration policy, wherein the step of generating the reflex action comprises:
   a) forming a percept of the stimulus; and
   b) elaborating the percept, according to the elaboration policy.

38. The adaptive method of claim 37, wherein the step of coordinating comprises updating the elaboration policy through the intercessory feedback control.

39. The adaptive method of claim 23, wherein the intercessory feedback control comprises an association policy, wherein:
   a) the step of generating the reflex action comprises forming a percept of the stimulus; and
   b) the step of generating the planned action comprises associating the percept to a schema, according to the association policy.

40. The adaptive method of claim 39, wherein the step of coordinating comprises updating the association policy through the intercessory feedback control.

41. The adaptive method of claim 23, wherein the intercessory feedback control comprises a deliberation policy, wherein the step of generating the planned action comprises executing a plan, according to the deliberation policy.

42. The adaptive method of claim 41, wherein the step of coordinating comprises updating the deliberation policy through the intercessory feedback control.

43. The adaptive method of claim 23, wherein the intercessory feedback control comprises a feedback policy, wherein the step of coordinating further comprises setting a new upstream policy, according to the feedback policy.

44. The adaptive method of claim 23, wherein the nexus further comprises a learning-reflection intercessory feedback control, wherein the method further comprises:
   a) assessing a performance metric of the intelligent agent; and
   b) adaptively re-programming the adaptive architecture to modify the performance metric, through the learning-reflection intercessory feedback control.

45. The adaptive method of claim 23, further comprising:
   a) sharing an agent state and an agent plan with the other intelligent agents; and
   b) securely collaborating with the other intelligent agents to satisfy the goal.

46. An adaptive method for controlling a plurality of software intelligent agents to respond to a stimulus according to a goal, the method implemented as an adaptive architecture on one or more computing devices, the method for each intelligent agent comprising:
   a) generating a reflex action to the stimulus by the intelligent agent;
   b) generating a planned action to the stimulus by the intelligent agent, according to the goal; and
   c) coordinating the reflex action generation and the planned action generation by a nexus to re-program the adaptive architecture to inter-operatively update the reflex actions, wherein the nexus comprises an intercessory feedback control.

47. The adaptive method of claim 46, wherein each of the computing devices comprises at least one of a RAM, a ROM, a disk, an ASIC, a PROM, and a re-programmable memory.

* * * * *